United States Patent [19]

Kornrumpf

[11] 4,422,138

[45] Dec. 20, 1983

[54] POWER SUPPLY FOR LOW-VOLTAGE LOAD

[75] Inventor: William P. Kornrumpf, Albany, N.Y.

[73] Assignee: General Electric Company, Schenectady, N.Y.

[21] Appl. No.: 329,792

[22] Filed: Dec. 11, 1981

[51] Int. Cl.³ .......................................... H02M 3/335
[52] U.S. Cl. ...................................... 363/21; 363/56; 363/97; 323/222; 323/282
[58] Field of Search .................................. 363/20–21, 363/124, 56, 97, 131; 323/222, 239, 282–288

[56] References Cited

U.S. PATENT DOCUMENTS

| | | | |
|---|---|---|---|
| 3,160,808 | 12/1964 | Kruse, Jr. ...................... | 323/239 X |
| 3,753,075 | 8/1973 | Tomura et al. ................. | 363/131 |
| 3,959,716 | 5/1976 | Gilbert, Jr. et al. ............ | 323/288 |
| 4,037,271 | 7/1977 | Keller ............................ | 363/21 |
| 4,163,278 | 7/1979 | Onoue et al. ................... | 363/21 X |
| 4,168,477 | 9/1979 | Burchall ........................ | 323/222 |

FOREIGN PATENT DOCUMENTS

| | | |
|---|---|---|
| 1510644 | 5/1978 | United Kingdom . |
| 1515127 | 6/1978 | United Kingdom . |
| 1563956 | 4/1980 | United Kingdom . |
| 1578267 | 11/1980 | United Kingdom . |
| 1597870 | 9/1981 | United Kingdom . |

Primary Examiner—Peter S. Wong
Attorney, Agent, or Firm—Geoffrey H. Krauss; James C. Davis, Jr.; Marvin Snyder

[57] ABSTRACT

A power supply operating at high frequencies for energizing a low-voltage lamp and the like loads, utilizes an autotransformer in series with a switching device. The series combination receives a voltage, greater than the voltage required for load operation, from commercial power mains. The load is tapped down upon the autotransformer, with the load current magnitude being controlled by variation of the percentage of time during which the switching device is in the conductive condition, during a power supply cycle interval; the conductive time is adjusted responsive to the current sensed to be flowing through the transformer and hence through the load.

22 Claims, 13 Drawing Figures

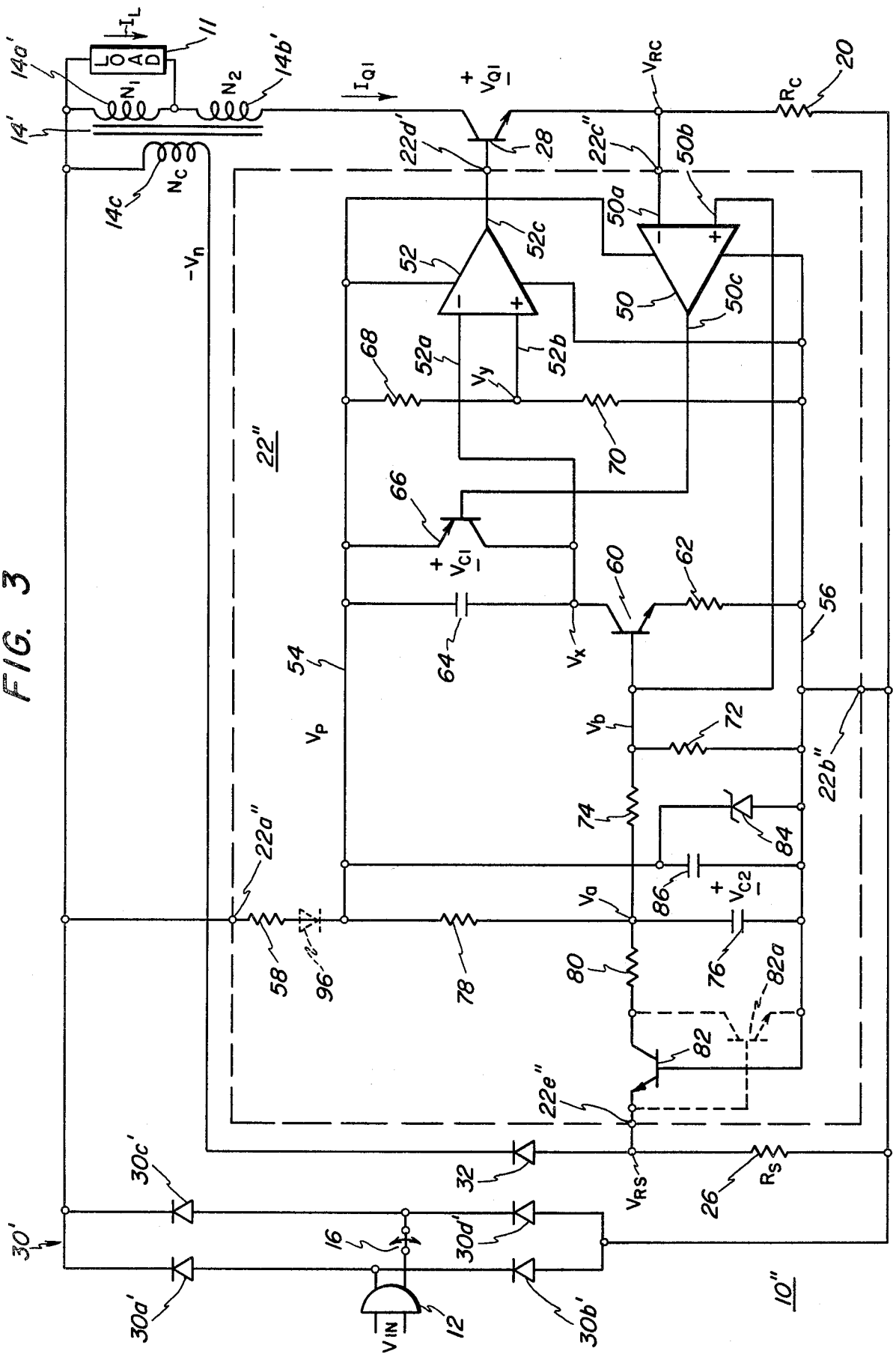

POWER SUPPLY FOR LOW-VOLTAGE LOAD

BACKGROUND OF THE INVENTION

The present application relates to low voltage power supplies and, more particularly, to a novel high-frequency power supply for energizing a low voltage load at a substantially constant load current level.

It is often desirable to operate a low voltage load from a relatively higher voltage A.C. source. In particular, there exists a class of low voltage (24–36 volt) lamps having an improved efficacy due to operation of the lamp filament at a higher temperature than has been traditionally used for lamp operation. It is highly desirable to operate these relatively low voltage lamps from the commercial A.C. power mains having a nominal 120 volts r.m.s. value, in residential and commercial operation. However, the mere reduction of the line voltage, through a stepdown transformer and the like, is insufficient to provide a carefully-controlled lamp filament temperature, to assure a reasonable lamp life at controlled lamp output. A power supply capable of energizing a lower voltage load from a higher voltage line, while controlling the load current, is thus highly desirable.

BRIEF SUMMARY OF THE INVENTION

In accordance with the invention, apparatus for supplying current to a low voltage load from a high voltage souce includes the series connection of an autotransformer, a current-switching device and a current sensing element across the line, with the load being connected to a secondary winding of the autotransformer. Transformer current, when the switching device is in the conductive condition, is sensed across the sensing element and is utilized to control the proportion of a time interval, of several orders of magnitude less duration that the duration of the cycle of the source waveform, to provide a peak-current-control inverter supplying a controlled load current.

In one presently preferred embodiment of the present invention, the switching device is a bilaterally-conductive device, while in other preferred embodiments a unilaterally-conducting device is utilized with a diode-bridge circuit formed either around the switching device or at the line input to the power supply. Over-voltage damage to the switching device is prevented by the use of varistor voltage-clipping means and the like, or by use of a catch winding, to reduce the switching device "on" proportion for a high frequency supply cycle time interval, thus reducing the voltage across the auto-transformer primary winding when the switching device turns "off".

Accordingly, it is an object of the present invention to provide a novel high-frequency power supply for energizing a low-voltage lamp and the like loads.

This and other objects of the present invention will become apparent upon consideration of the following detailed description, when read in conjunction with the drawings.

DETAILED DESCRIPTION OF THE DRAWINGS

FIG. 3 is a schematic diagram of the presently preferred embodiment of FIG. 1b, including the circuitry of the control circuit means presently preferred for utilization therein.

DETAILED DESCRIPTION OF THE INVENTION

Figure 1:
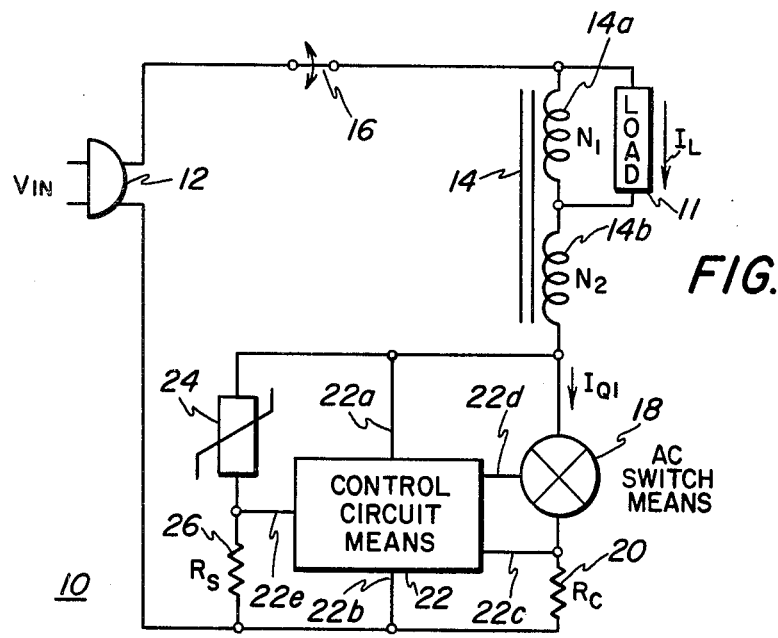
FIG. 1 is a schematic diagram of a low voltage power supply, in accordance with the principles of the present invention.

Referring initially to FIG. 1, a low voltage power supply 10 for energizing a low-voltage load 11, such as an incandescent lamp and the like, receives power from the A.C. power mains, as illustrated by input power plug 12. A voltage-step-down autotransformer 14 is connected in series with an on/off switch 16, a A.C. switching means 18 and a current-sampling resistance 20, of resistance magnitude $R_c$, across the A.C. mains. Load 11 is connected across a first portion 14a of the autotransformer; portion 14a has $N_1$ turns, while a remaining autotransformer portion 14b has $N_2$ turns. A control circuit means 22 receives operating power at an input 22a thereof, with respect to a common terminal 22b thereof. The voltage across sampling resistance 20 is provided at a first signal input 22c of the control circuit means and an output 22d provides a signal for driving switching means 18 into the conductive "on" and non-conductive "off" conditions at a relatively high frequency (typically several orders of magnitude greater than the powerline 12 frequency). Control circuit means energizing input 22a is connected to the junction between autotransformer 14 and switching means 18, as is one terminal of a bilateral voltage-clipping device 24, such as a varistor and the like. The remaining terminal of varistor 24 is connected both to a second signal input 22e of the control circuit means, and through another sensing resistance 26 of magnitude $R_s$, to common terminal 22b.

The A.C. switching means 18 maybe any bilaterally-conducting switching device capable of being turned both "on" and "off". This device may be an A.C transistor, a symmetrical field-effect transistor and the like. Devices such as a triac and the like are generally not utilizeable in the configureation of FIG. 1, as such device, while capable of being turned to the conductive "on" condition, cannot be turned "off" by gate control to the non-conductive condition at any time. In the event that load 11 presents an open circuit across autotransformer 14, such open circuit would cause a relatively high voltage to appear across switching means 18; the voltage clipping level of varistor 24 is selected to limit the voltage across the bilateral switching means 18 in such case. This is especially important because control circuit means 22 will cause switching means 18 to switch at a relatively high frequency, at least one order (and typically two-four orders) of magnitude greater than the line frequency (60 Hz. in the United States), whereby extremely large changes (di/dt) of current, with respect to time, occur and may produce large voltages across autotransformer 14 and device 18.

Figure 1A:
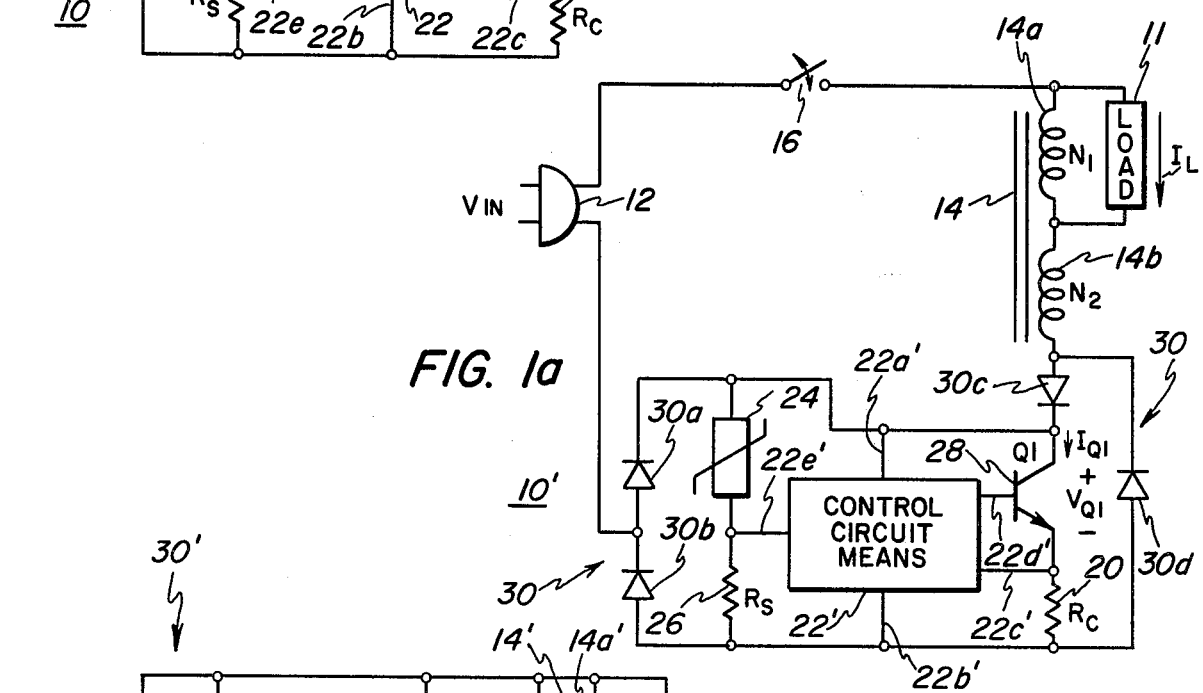
FIG. 1a and 1b are schematic diagrams of alternative embodiments of a low voltage power supply, in accordance with the principles of the present invention, and utilizing a unilaterally-conducting switching element.
Figure 1B:
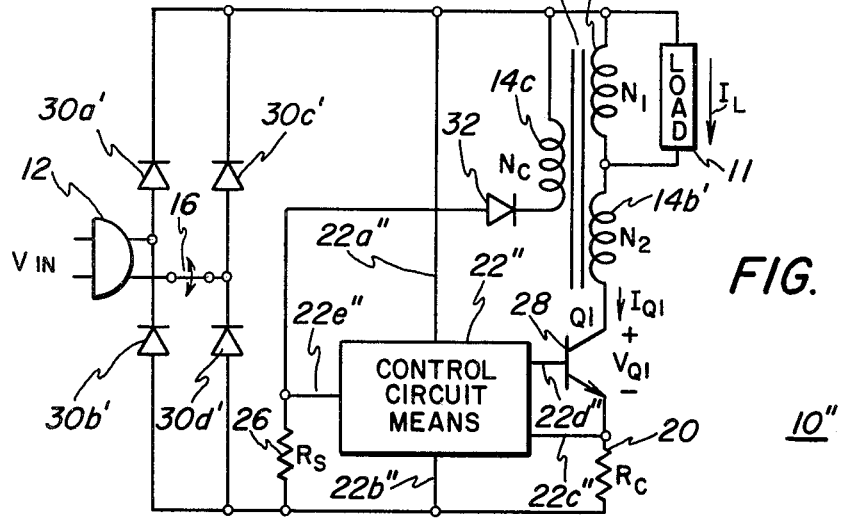
Figure 2A:
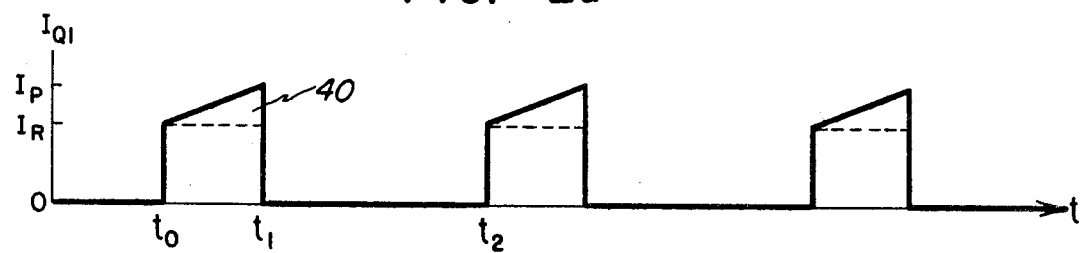
FIGS. 2a–2c are coordinated graphical representations of the various waveforms occuring in the circuits of FIGS. 1–1b.
Figure 2B:
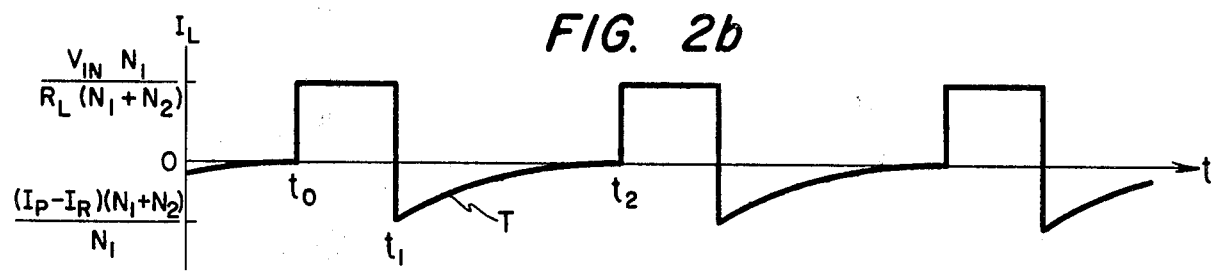
Figure 2C:
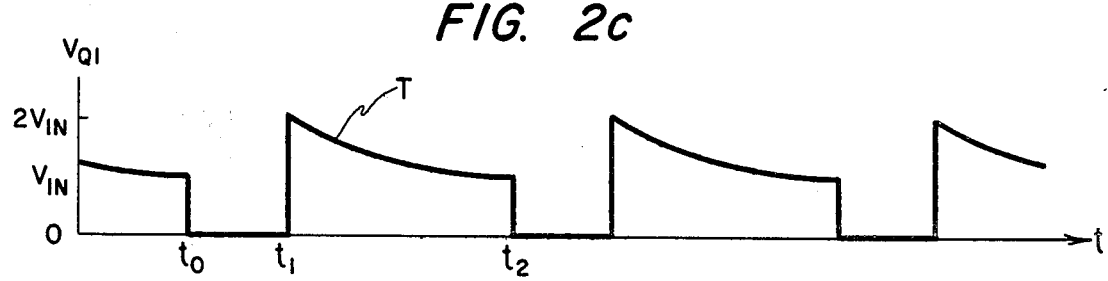
Figure 4A:
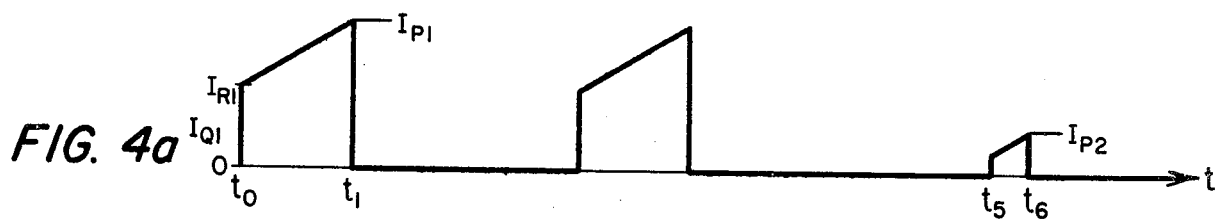
FIGS. 4a–4f are coordinated graphical representations of the waveforms occurring in the embodiment of FIG. 3.
Figure 4B:
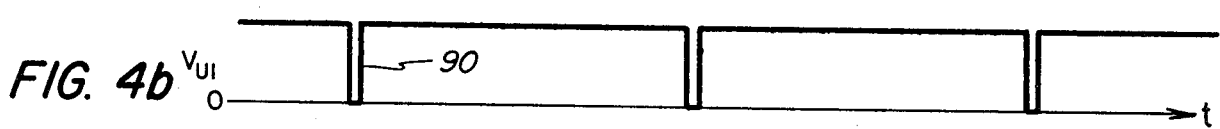
Figure 4C:
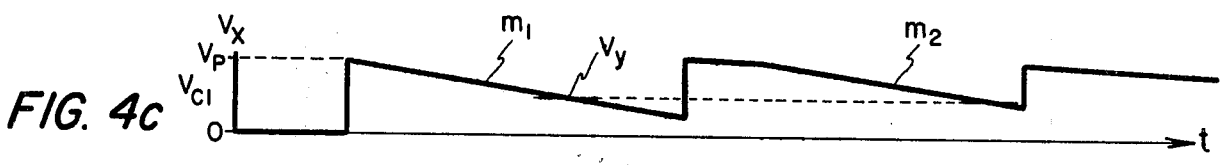
Figure 4D:
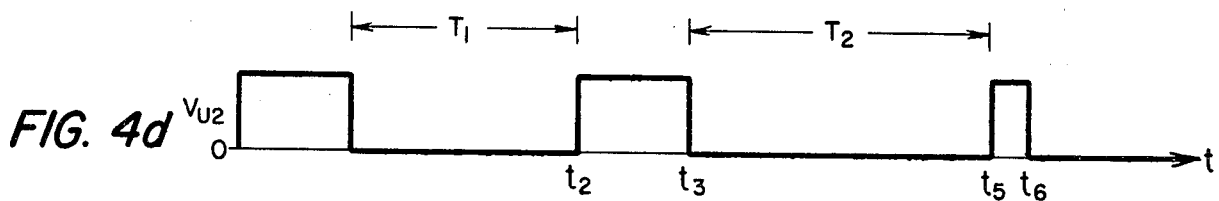
Figure 4E:
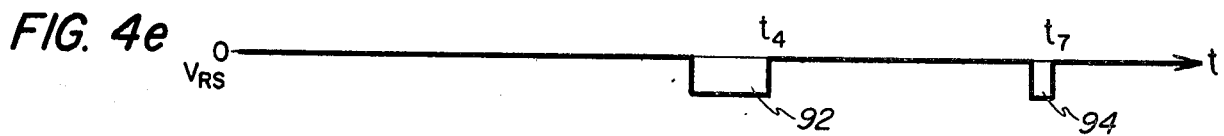
Figure 4F:
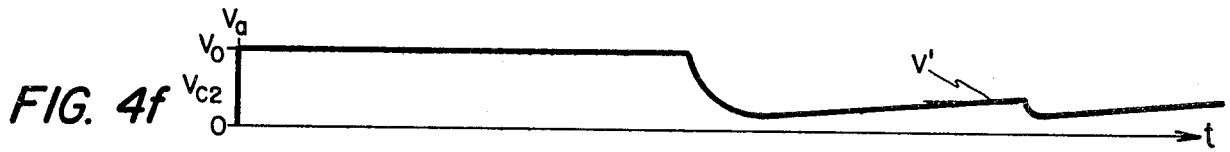

Due to the present high cost of a bilaterally-conducting device capable of being turned both "on" and "off", it is presently preferable to utilize a unilaterally-conducting switching means 28, as shown in FIGS. 1a and 1b. Preferably, the unilaterally-conducting switching means 28 is a power transistor. A bridge rectifier 30, comprised of four unilaterally-conducting elements 30a–30d, such as diodes and the like, is utilized to allow unidirectional current flow through transistor 28. Thus, device 28 and bridge means 30 replace the A.C. switching device 18. In the embodiment of FIG. 1a, bridge means 30 is formed between the power source (present at power input 12) and autotransformer 14, and thus includes the unilateral switching device within a full-wave bridge. In this configuration, the current in autotransformer 14 will still be of bidirectional nature, as in the circuit of FIG. 1, while the current in device 28 is of unidirectional nature, as provided by the rectification action of bridge rectifier 30. Because of the high pulse frequency utilized and the high turn-on and turn-off speeds of the power transistor 28, bridge rectifier diodes 30a–30d must be high speed devices; use of relatively slow-speed rectifiers would result in very high transient currents, especially during turn-on of device 28.

An even more-cost-effective circuit is that of FIG. 1b, wherein relatively slow-speed diodes 30a'–30d' are utilized in a full-wave line rectifier 30', to apply rectified line-voltage D.C. to both the auto-transformer 14' and switching device 28. In this circuit 10", the rectifiers 30a'–30d' are only required to withstand the line voltage (approximately 120 volts r.m.s.) and can be relatively slow-speed 60 Hz. devices. In both circuits 10' and 10", the unilaterally-conducting device 28 can be a bipolar transistor, a power field-effect transistor, a gate-turn-off thyristor and the like devices.

In the circuit of FIG. 1b, the power supply does not reverse its polarity each half cycle, as occurs in the circuits 10 and 10' of FIGS. 1 and 1a, and even greater circuit efficiency is realized by utilizing a lossless technique to limit the voltage on power transistor 28. This lossless technique utilizes a catch winding 14c, having $N_c$ turns wound about the same core as the autotransformer windings 14a' and 14b'. The cathode of a protection diode 32 is connected to that end of catch winding 14c which is not connected to the load, while the anode of protection diode 32 is connected to control circuit means input 22e" and second sensing resistor 26. Thus, the current flowing through catch winding 14c is monitered (by conversion to a voltage appearing across second sensing resistor 26) and is utilized to change the duty cycle of the drive pulses at control circuit means output 22d', to prevent excessive conduction of the switching device collector current $I_{Q1}$ when a load (lamp) 11 is either not present across the autotransformer or has burned out. In the circuit 10" of FIG. 1b, a small D.C. voltage may be present across the load due to transformer winding resistance effects; due to the bidirectional current flow to the autotransformer in circuits 10 and 10', no D.C. component is provided across the load therein.

Referring now to all of FIGS. 1–1b and 2a–2c, all of circuits 10, 10' and 10" operate in substantially similar fashion. Initially, the switching device is in the non-conductive "off" condition, whereby the device current $I_{Q1}$ (FIG. 2a) is substantially zero. The foregoing is true whether the input voltage $V_{IN}$ is in the positive half-cycle or negative half-cycle. For purpose of explanation, the following assumes that the activity occurs during a positive half-cycle, although operation during a negative half-cycle merely means, in circuit 10', that the direction of load current $I_L$ (FIG. 2b) is reversed, and that, in circuit 10, the load current, device current and switching device voltage (FIGS. 2a–2c) are all reversed during that half cycle.

At some time $T_0$, an appropriate signal at control means output 22d drives switching device $Q_1$ to the conductive "on" condition. The closed switch means causes load current $I_L$ to flow, with a magnitude essentially equal to $V_{IN}N_1/R_L(N_1+N_2)$. The switching device voltage $V_{Q1}$ falls substantially to zero and the switching device current $I_{Q1}$ rises to a reflected load curent $I_R$. Thus, substantially the full input voltage is impressed across the autotransformer windings 14a and 14b; the current flowing through the switching device is the reflected load current $I_R$. The transformer magnetizing current thereafter increases, in portion 40 of FIG. 2a, until some time $t_1$ when control circuit means 22 turns the switching means to the non-conductive "off" condition, by removing the drive thereto. The switching means open circuit causes the switching device current $I_{Q1}$ to fall essentially to zero, and the energy stored, in the form of the core magnetizing current, in transformer 14 is transferred to the transformer secondary winding 14a and causes a rapid loan-current polarity reversal. The reversed-polarity load current (FIG. 2b) now has a magnitude inversely proportional to the turns ratio $(N_1/N_1+N_2)$ and to the peak $(I_P-I_R)$ of the transformer magnetizing current portion 40. The circuit parameters and control circuit timing are set such that, simultaneously therewith, at time $T_1$, the voltage $V_{Q1}$ (FIG. 2c) increases to substantially twice the input voltage magnitude. Thereafter, until the switching device is again turned on at time $t_2$, the load current $I_L$ decays toward zero, and the switching device voltage $V_{Q1}$ decays toward the input voltage magnitude $V_{IN}$, with a time constant T, of magnitude dependent upon the inductance and resistance in the autotransformer circuit. At time $t_2$, the entire cycle begins anew. As one cycle, from time $t_0$ to $t_2$, requires only tens of microseconds, the magnitude of the input voltage $V_{IN}$ does not appreciably change on a switching cycle-to-switching cycle basis.

As previously mentioned hereinabove, if load 11 is for some reason removed from across autotransformer secondary winding 14a, the voltage across second sensing resistance 26 increases and reduces the conductive "on" time (the interval between time $t_0$ and time $t_1$) of the switching device, to reduce the peak current and therefore the magnitude of the voltage spike, when the device 18 or 28 is turned "off". Similarly, control means 22 also monitors the voltage across first sensing resistance 20, which is proportional to the device current $I_{Q1}$, which reflects the load current $I_L$. The conductive "on" duration is thus adjusted by control circuit means 22 to provide and maintain a desired load current.

Referring now to FIGS. 3 and 4 (waveforms a–f), a presently preferred control circuit means 22", is used in the presently preferred circuit 10". Control circuit means 22" includes first and second comparators 50 and 52, each receiving the operating potential between a potential bus 54 and a common bus 56. Common bus 56 is connected to control circuit common 22b". Potential bus 54 is connected to control circuit input 22" through a resistance element 58. An inverting input 50a of the first comparator is connected to control circuit input 22c", at the junction between first sensing resistance 20 and the emitter electrode of switching device 28. A non-inverting input 50b of the first comparator is connected to the base electrode of a transistor 60. The emitter electrode of transistor 60 is connected through a resistance 62 to common bus 56. The collector electrode of transistor 60 is connected through a capacitance 64 to operating potential bus 54. The emitter-collector circuit of another transistor 66 is connected across capacitor 64, with the base electrode of transistor 66 being connected to the output 50c of first comparator 50. The junction between the collector electrodes of transistors 60 and 66 and capacitance 64, is connected to an inverting input 52a of second comparator 52. A voltage divider, comprised of resistance elements 68 and 70, is connected between operating potential bus 54 and common bus 56. The junction between resistance elements 68 and 70 is connected to a non-inverting input 52b of the second comparator. The second comparator output 52c is connected to the control circuit output 22d' and thence to the control (base) electrode of switching device 28.

The base of transistor 60 is connected through a resistance element 72 to common bus 56, and through a resistance element 74 to one terminal of a capacitance 76. The remaining terminal of capacitance 76 is connected to ground bus 56. The junction of resistance 74 and capacitance 76 is also connected through a resistance 78 to operating potential bus 54, and through another resistance 80 to the collector electrode of a third transistor 82. The base electrode of transistor 82 is connected to common bus 56, while the emitter electrode thereof is connected to control circuit input 22e''. The magnitude $V_p$ of the operating potential on bus 54 is established by a voltage-regulator (zener) diode 84, operating in conjunction with a filtering capacitance 86, connected between bus 54 and common bus 56.

In operation, a peak-current-controlled inverter is formed with the transistor current monitored by first comparator 50, across first sensing resistance 20. At some time immediately prior to time $t_0$, second comparator output 52c goes to a high condition, providing sufficient drive at control circuit output 22d' to turn on device 28 at time $t_0$. Accordingly, at time $t_0$, the device collector current $I_{Q1}$ (waveform a) abruptly increases to the reflected load current value $I_{RF}$. The collector current thereafter increases, due to the autotransformer magnetizing current, until a peak current of magnitude $I_{P1}$ is reached at time $t_1$. At this time, the transistor emitter current flowing through first sensing resistor 20 provides a voltage, at first control circuit means input 22c'' and first comparator input 50a, which is greater than a reference voltage provided at first comparator input 50b. Accordingly, the first comparator output 50c (waveform b) abruptly changes from a high condition to a low (substantially zero) level, causing turn-on of transistor 66 and discharging of capacitor 64. Thus, the voltage $V_x$ across capacitor 64 becomes essentially equal to $V_p$, the voltage on operating potential bus 54, at time $t_1$. The increased voltage $V_x$ magnitude appears at second comparator input 52a and is greater than the $V_y$ voltage provided by the resistances 68 and 70 divider at remaining second comparator input 52b, whereby the second comparator output 52c (waveform d) falls to a low level and turns off device 28. The current previously flowing in transformer 14' circulates through the impedance of load 11 and the $N_1$ turns of secondary winding 14a'.

Transistor 28 having been turned "off", current ceases to flow through sensing resistance 20 and the voltage at first comparator input 50a is reduced. Responsive thereto, first comparator output 50c reverts to the high output voltage condition, at point 90, causing transistor 66 to be turned off and allowing capacitor 64 to begin charging towards the common bus 56 potential, through a current source including transistor 60. Thus, the $V_x$ voltage begins to decrease, with a slope $m_1$, determined by the current flowing through device 60. Device 60, in conjunction with resistances 62, 72 and 74 comprise a variable current source for charging capacitance 64 responsive to the voltage $V_a$ appearing across capacitance 76. Thus, the slope $m_1$ of the $V_x$ voltage is proportional to the voltage $V_a$ at capacitance 76. Because the voltage divider formed by resistances 72 and 74 not only sets the capacitor 64 charging current but also establishes the comparison voltage at first comparator input 50d, the peak current comparison and transistor 28 turnoff point are both proportional to the voltage $V_a$ on capacitance 76.

The voltage $V_x$ continues to decrease for a time interval $T_1$, until the second comparator input 52a voltage is substantially equal to the second comparator input 52b voltage $V_y$. At that time $t_2$, the second comparator output 52c is again enabled to the high state, turning on transistor 28 and providing another pulse of collector current through autotransformer 14' to load 11. The device 28 collector current pulse continues until time $t_3$, when the voltage across sensing resistance 20 increases to the extent that first comparator output 50c is again lowered and capacitance 64 is discharged through transistor 66. This cyclic behavior continues as long as power is provided to circuit 10'', if the capacitance 76 voltage $V_a$ (waveform f) does not appreciably change.

If the impedance of load 11 changes, illustratively at time $t_3$, the voltage magnitude $(-V_n)$ across catch winding 14c will become sufficiently large to forward bias diode 32 and provide a non-zero, negative-polarity voltage across second sensing resistance 26. This negative-going change in the normally-zero- magnitude second input 22e'' voltage $V_{RS}$, (shown as portion 92 in waveform e) causes transistor 82 to be turned on. Transistor 82 remains on until the catch winding voltage returns to some predetermined value, at time $t_4$, which value is determined by the ratio of the catch winding turns $N_C$ to the transformer winding turns $N_1$ and $N_2$, and to the magnitude $R_S$ of second sensing resistance element 26. During the time interval between time $t_3$ and $t_4$ the voltage $V_a$ across capacitance 76 is reduced in exponential fashion, with a time constant related to the product of the capacitance of element 76 and the resistance of element 80. Thus, the magnitude of reference voltage $V_a$ is reduced at the input of the resistance element 72 and 74 divider, whereby the reference voltage to both first comparator input 50b and current source resistor 60 base electrode are reduced. Accordingly, the rate at which capacitance 64 charges is reduced, whereby the effective slope $m_2$ of the $V_x$ voltage, and time interval $T_2$, is reduced to less than the slope $m_1$ in the previous cycles. Therefore, the time interval $T_2$ required before the $V_x$ voltage is equal to the $V_y$ fixed voltage, increases and second comparator U2 does not turn on device 28 for a time interval which is greater than the time interval $T_1$ in the previous operation. By increasing the "off" time interval, the average current through the load is decreased, to compensate for the previous impedance increase, which tended to increase the load current $I_L$. Thus, when transistor 28 is again turned "on" at time $t_5$, the voltage $V_a$ across capacitance 76 has only increased to a value $V'$, which is smaller than the original value $V_0$ thereacross. As the reference voltage at first comparator input 5b is now lower than previously provided, the device collector current $I_{Q1}$ attains a much lower value before the voltage $V_{RC}$ across first sensing resistance 20 is sufficiently high to cause the first comparator output 50c to change to the low state and discharge capacitance 64, resetting comparator 52 and removing device 28 base drive. Thus, by time $t_6$, where the transistor "on" time $t_6-t_5$ is much less than the normal transistor "on" time ($t_3-t_2$ or $t_1-t_0$), device 28 ceases to provide additional current to the autotransformer. Accordingly, a lesser amount of energy is stored in the transformer winding, provided to load 11 and provides a catch winding 14c voltage capable of providing a negative voltage at control circuit input 22e" of lesser duration, e.g. the negative-polarity voltage $V_{RS}$ portion 94. it will be seen that portion 94 has a duration, beginning at time $t_6$ and ending at time $t_7$, which time duration is considerably less than the time duration of catch winding pulse 92, beginning at time $t_3$ and ending at time $t_4$. As portion 94 is of lesser duration, device 82 is enabled for a correspondingly smaller time and decreases the reference $V_a$ voltage by a lesser extent, than the decrease therein responsive to portion 92. It should be noted that in the embodiments 10 and 10' utilizing a varistor element 24, this reduction in catch winding "on" time also would reduce the energy required to be dissipated in the varistor.

It will also be seen that the magnitude of operating potential $V_p$, and therefore of reference voltage $V_a$ is held constant by action of the voltage regulator diode 84, the line voltage should change over normal limits; thus, the peak-current-control aspects of the control circuit means 22" remain relatively constant with changes in line voltage, assuring greater consistency of load current consumption during operation.

It should be understood that in the bidirectional-current-flow systems 10 and 10', a diode 96 (shown in broken line in FIG. 3) would be added in series with input dropping resistance 58, to rectify the A.C. voltage applied to filter capacitance 86 and voltage regulator 84. In such A.C. systems, an additional transistor 82a may be positioned in parallel with transistor 82 and poled such that transistor 82a turns on when a positive-polarity pulse appears across second sensing resistance 26, so that the capacitor 76 reference voltage $V_a$ can be varied during either the positive or the negative half-cycle of the A.C. line waveform. Similarly, it should be understood that additional comparators may be required effectively in parallel with first comparator 50 to detect negative peak currents through sensing resistance 20, or effectively in parallel with second comparator 52 to provide the required drive to a bilaterally-conducting device (in system 10 of FIG. 1) during the negative half-cycle of the source waveform.

While several presently preferred embodiments of my novel high frequency power supply for energizing a low-voltage load have been presented herein, many variations and modifications will now become apparent to those skilled in the art. It is my intent, therefore, to be limited only by the scope of the appending claims and not by the specific details and/or instrumentalities described by way of explanation herein.

What is claimed is:

1. A current-regulating power supply for energizing a load at a voltage magnitude less than the voltage magnitude provided by an A.C. source, comprising:

an autotransformer having a tapped winding, said load being connected solely between a first end and the tap of said winding;

switching means connected to said autotransformer only at a remaining end of said winding for enabling a flow of current from said source through said winding during the duration of a control signal;

means for providing a sampling signal of magnitude responsive to the instantaneous current flowing through said switching means; and control circuit means for providing said control signal at an operating frequency at least an order of magnitude greater than the frequency of said A.C. source and for adjusting, responsive to said sampling signal magnitude, the proportion of time during each of a successive plurality of operating frequency cycles during which said switching means conducts current, to mainain the current through said load at a substantially constant value.

2. The power supply of claim 1, further comprising means coupled to said circuit control means for protecting said switching means from damage in the event that said load is not connected to said power supply.

3. The power supply of claim 1, wherein said sampling signal providing means and said switching means are effectively in series connection with said winding across the voltage of said source.

4. The power supply of claim 3, wherein said sampling signal providing means is a resistance element.

5. The power supply of claims 1 or 3, wherein said switching means comprises a bidirectionally-conducting device receiving said control signal and capable of being controlled to conductive and non-conductive conditions respectively by one and the other of the presence and absence of said control signal.

6. The power supply of claim 5, wherein said device is an A.C. transistor having a collector-emitter circuit in series with said winding and having a base electrode receiving said control signal.

7. The power supply of claim 1, wherein said switching means comprises a bridge rectifier having first and second opposed terminals, connected between said source and one end of said winding, and having third and fourth opposed terminals; and a unidirectionally-conducting device operatively connected between the third and fourth opposed terminals of said bridge rectifier to cause said current flow through said transformer winding from said source responsive to said control signal.

8. The power supply of claim 7 wherein said device is a transistor.

9. The power supply of claim 8, wherein said circuit control means is also connected between said third and fourth terminals of said bridge rectifier.

10. The power supply of calim 8, further comprising means coupled to said circuit control means for protecting said switching means from damage in the event that said load is not connected to said power supply.

11. The power supply of claim 10, wherein said protection means includes means for providing to said control circuit means another sampling signal of magnitude responsive to the instantaneous peak voltage across said winding.

12. The power supply of claim 11, wherein said another sampling signal providing means includes: a sampling resistance; and a symmetrical-voltage-limiting element connected between said sampling resistance and said winding remaining end.

13. The power supply of claim 7, wherein said bridge rectifier provides a substantially D.C. potential from said source for application to the series-connected circuit of said switching device, said winding and said sample signal providing means.

14. The power supply of claim 13, wherein said switching device is a transistor.

15. The power supply of claim 13, further including means coupled to said circuit control means for protecting said switching means from damage in the event that said load is not connected to said power supply.

16. The power supply of claim 15, wherein said protecting means includes: a sampling resistance; a monitoring winding upon said autotransformer; and a unidirectionally-conducting element connected between said monitoring winding and said sampling resistance and poled to conduct only when the voltage across the monitoring winding is of a predetermined polarity; said control circuit means receiving the voltage across said sampling resistance for reducing switching device conduction time to reduce the resulting voltage across said winding.

17. The power supply of claim 13, wherein said control circuit means includes:
means for providing a substantially constant operating potential, different than the load voltage, with respect to a common control circuit potential;
means for providing first and second reference potentials derived from said operating potential;
a capacitive element;
means for charging said capacitive element toward said operating potential at a rate determined at least in part by the magnitude of said first reference potential;
means for discharging said capacitive element if said sampling signal is of a magnitude greater than said first reference potential magnitude; and
means for providing said control signal only when the magnitude of the potential across the capacitive element is less than the magnitude of said second reference potential.

18. The power supply of claim 17, wherein said capacitive element has a first terminal receiving said operating potential and a second terminal; and said charging means comprises a transistor having a collector electrode connected to said capacitor element second terminal, a base electrode receiving said first reference potential and an emitter electrode; and a resistance element connected directly between said transistor emitter electrode and said common control circuit potential.

19. The power supply of claim 17, wherein said discharging means comprises a first comparator having a first input receiving said first reference potential, a second input receiving said sampling signal, and an output providing a signal in a predetermined condition whenever said sampling signal magnitude is greater than said first reference potential magnitude; and a switching device having a controlled circuit connected across said capacitive element and having a control electrode receiving the first comparator output signal for providing a low resistance across said capacitive element when said comparator output is at said predetermined condition.

20. The power supply of claim 17, wherein said control signal providing means comprises a second comparator having a first input receiving said second reference potential, a second input receiving the potential across said capacitive element, and an output providing said control signal to said switching device whenever the magnitude of the potential at said second comparator second input is greater than the magnitude of the potential at said second comparator first input.

21. The power supply of claim 17, further including a sampling resistance; a monitoring winding upon said autotransformer; and a unidirectionally-conducting element connected between said monitoring winding and said sampling resistance and poled to conduct only when the voltage across the monitoring winding is of a predetermined polarity; and said control circuit means further including means for varying the magnitude of said first reference potential to reduce switching device conduction time to reduce the resulting voltage across said winding whenever said predetermined polarity voltage is present across said sampling resistance.

22. The power supply of claim 21, wherein said first reference potential providing means includes another capacitive element; and means for charging said another capacitive element from said operating potential; and said conduction time reducing means includes at least one transistor having a base electrode receiving said common control circuit potential, an emitter electrode receiving said sampling resistance voltage, and a collector electrode; and a resistance element in series between said collector electrode and said another capacitive element and of magnitude selected to provide a predetermined discharge time constant for said another capacitive element whenever said transistor is caused to conduct by said sampling resistance voltage being of said predetermined magnitude.

* * * * *